United States Patent [19]
Ohta et al.

[11] Patent Number: 5,167,323
[45] Date of Patent: Dec. 1, 1992

[54] LENS TREATING DEVICE FOR TREATING CONTACT LENS

[75] Inventors: Kiyohiko Ohta, Aichi; Kaoru Kamiya, Nagoya; Keiko Watanabe, Inazawa, all of Japan

[73] Assignee: Tomei Sangyo Co., Ltd., Japan

[21] Appl. No.: 740,627

[22] Filed: Aug. 5, 1991

[30] Foreign Application Priority Data

Aug. 9, 1990 [JP] Japan .................. 2-213455

[51] Int. Cl.$^5$ .............................................. A45C 11/04
[52] U.S. Cl. ........................................ 206/5.1; 68/213; 134/901
[58] Field of Search ................. 206/5.1, 5; 366/130; 134/113, 182, 901; 68/213

[56] References Cited

U.S. PATENT DOCUMENTS

| | | | |
|---|---|---|---|
| 3,070,105 | 12/1962 | Brown | 206/5.1 |
| 3,101,087 | 8/1963 | Watson | 134/901 X |
| 3,139,097 | 6/1964 | Hungerford et al. | |
| 3,343,657 | 9/1967 | Speshyock | 134/901 X |
| 3,378,020 | 4/1968 | Grabiel | 134/901 X |
| 3,379,200 | 4/1968 | Pennell | 134/901 X |
| 3,519,005 | 7/1970 | Krezanoski et al. | |
| 3,602,238 | 8/1971 | Brown | 206/5.1 |
| 3,871,395 | 3/1975 | Murry | |
| 3,880,278 | 4/1975 | Brown | 206/5.1 |
| 4,444,307 | 4/1984 | Jermyn | |
| 4,782,946 | 11/1988 | Pollak | 206/5.1 X |
| 4,826,001 | 5/1989 | Castillo | |

FOREIGN PATENT DOCUMENTS

| | | |
|---|---|---|
| 0338991 | 10/1989 | European Pat. Off. |
| 3917590 | 12/1989 | Fed. Rep. of Germany |
| 1260342 | 3/1961 | France ............ 68/213 |
| 2014763 | 4/1970 | France |
| 2570513 | 3/1986 | France |
| 59-24015 | 7/1984 | Japan |
| 63-96533 | 6/1988 | Japan |

*Primary Examiner*—Bryon P. Gehman
*Attorney, Agent, or Firm*—Parkhurst, Wendel & Rossi

[57] ABSTRACT

A lens treating device for treating a contact lens includes: an outer casing having a cylindrical body which is open at at least one of opposite axial ends, and at least one lid removably attached to the cylindrical body to close the axial end(s) thereof; and a lens storage container which is accommodated in the outer casing such that the container is axially slidingly reciprocable within the outer casing. The lens storage container has at least one cap member removably attached thereto. The lens storage container fluid-tightly receives therein the contact lens and a liquid for treating the contact lens, whereby the liquid is forced to flow within the container so as to clean the contact lens, by a reciprocating movement of the lens storage container when the outer casing is axially shaked or repeatedly inverted. A method of treating a contact lens by using such a lens treating device is also disclosed.

15 Claims, 10 Drawing Sheets

LENS TREATING DEVICE FOR TREATING CONTACT LENS

BACKGROUND OF THE INVENTION

1. Field of the Art

The present invention relates in general to a lens treating device for treating a contact lens or lenses, for instance, cleaning, disinfecting, sterilizing or storing the contact lenses. More particularly, the invention is concerned with such a lens treating device which is easy to handle and is effective to prevent the lenses from being damaged or lost, and which is hygienically excellent and is available at a reduced cost. The present invention is also concerned with a method of treating contact lenses by using such a lens treating device.

2. Discussion of the Prior Art

Generally, after contact lenses for rectifying one's eyesight are removed from human eyes, the lenses need to be treated in suitable sequence, that is, cleaned, rinsed and stored, whether the lenses are hard or soft contact lenses. As for the soft contact lenses, it is necessary to boil the lenses on a regular basis for the purpose of disinfection.

More specifically, there is a need to clean the contact lenses so as to remove therefrom organic substances contained in tears, such as lipid, protein or glucide, and inorganic substances such as calcium or magnesium, which attach or adhere to the lenses during use. Various methods are known for cleaning the contact lenses. For example, a contact lens is rubbed with one's forefinger and thumb with the lens gripped therebetween. Alternatively, a contact lens may be put on a palm of one hand and rubbed by the forefinger of the other hand, while being pressed by the forefinger against the palm. There is also known a method of cleaning a soft contact lens, in which the contact lens is moved with one's forefinger on an exclusive cleaning puff so that the lens is rubbed against the puff. However, any of the above-described known methods is not free from possibilities of damaging or losing contact lenses during the cleaning operation. These methods also suffer from a problem that the contact lens is soiled by stained hands while the lens is cleaned by using the hands.

To solve the above-described problems, it is proposed to use an exclusive cleaning container which contains a cleaning liquid, so as to clean contact lenses accommodated in the container by shaking the container. An example of such a container is disclosed in laid-open publication No. 63-96533 of unexamined Japanese Utility Model Application.

More specifically described, the cleaning container disclosed in the publication has two lens holders which are supported by the container such that the holders may be rotated and moved up and down in the longitudinal direction of the container by a given small distance. In operation, a pair of contact lenses are received in the respective lens holders, and a suitable cleaning liquid is poured into the container. In this condition, the container is shaked up and down directly with one's hand, so that the lens holders are rotated and moved up and down in the container. Thus, the contact lenses held by the holders are cleaned. Each lens holder is supported by two rods fixed to the holder, each of the rods having at one end a ball which is rotated within and moved along a slot formed within the container. The rotary and linear movements of the ball permit the lens holders to be rotated and moved up and down when the container is shaked by one's hand.

The cleaning container as described above is rather complicated in construction and easy to be broken. In the case where the container is broken, the contact lenses may not be sufficiently cleaned, or may even be damaged by fragments of broken components. In addition, the cleaning container is of a holder type, and is therefore not suitable for cleaning soft contact lenses. The cleaning container has another problem. That is, if the shaking action for cleaning the lenses is not satisfactory, the lens holders are not given rotary motions, but only perform linear movements along the above-indicated slots. In this case, it is difficult to attain a sufficient cleaning effect especially when the contact lenses received in the lens holders have an attitude parallel to the direction of the linear movements of the holders.

SUMMARY OF THE INVENTION

The present invention was developed in light of the above-described prior art situations. It is therefore a first object of the present invention to provide a lens treating device for treating a contact lens or lenses, which is economical to manufacture, is unlikely, to be broken and is easy to handle, and which provides a high degree of cleaning effect.

It is a second object of the invention to provide a method of treating a contact lens or lenses by using such a lens treating device as described above, which method includes successive operations of cleaning, rinsing and storing the contact lenses, for example.

The first object may be attained according to the principle of the present invention, which provides a lens treating device for treating a contact lens, comprising: an outer casing having a cylindrical body which is open at at least one of opposite axial ends, and at least one lid removably attached to the cylindrical body to close the above-indicated at least one axial end thereof; and a lens storage container which is accommodated in the outer casing such that the container is axially slidingly reciprocable within the outer casing, the lens storage container having at least one cap member removably attached thereto. The lens storage container fluid-tightly receives therein the contact lens and a liquid for treating the contact lens, whereby the liquid is forced to flow within the container so as to clean the contact lens, by a reciprocating movement of the lens storage container when the outer casing is axially shaked or repeatedly inverted.

By use of the present lens treating device constructed as described above, a contact lens can be cleaned, rinsed and stored successively, with the lens stored in the lens storage container of the device. Accordingly, the contact lens is favorably prevented from being broken or lost, and is free from stains which would otherwise be transferred from fingers. Further, when the lens storage container storing the contact lens is axially slidingly shuttled or reciprocated within the outer casing, considerably intensive flows of the liquid take place in the container, as compared with the actual distance of the manual shaking of the outer casing, to thereby permit a considerably effective cleaning of the lens. Moreover, the present lens treating device is simple in construction, and is therefore manufactured at a reduced cost. The lens treating device is also unlikely to be broken, permitting stable and effective cleaning of contact lenses.

The lens storage container may have at least one lens storage chamber for accommodating the contact lens. The lens storage chamber or chambers is/are at least partially defined by a partition structure having a plurality of holes formed therethrough to permit the liquid to flow therethrough.

In the above arrangement, the contact lens which is stored in the lens storage chamber is prevented from being moved with flows of the liquid in the container, whereby the liquid flowing therein effectively acts on the surface of the contact lens. In addition, the contact lens may be rubbed with the partition structure when the lens collides against the structure. Thus, the contact lens can be further effectively cleaned with high efficiency.

The second object may be attained according to the principle of the present invention, which provides a method of treating a contact lens by using such a lens treating device as described above, which method comprises the steps of (a) placing the contact lens in the lens storage container and pouring the liquid into the container; (b) inserting the lens storage container into an interior space of the outer casing; and (c) axially shaking or repeatedly inverting the outer casing so that the liquid is forced to flow within the lens storage container so as to clean the contact lens.

BRIEF DESCRIPTION OF THE DRAWINGS

The above objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
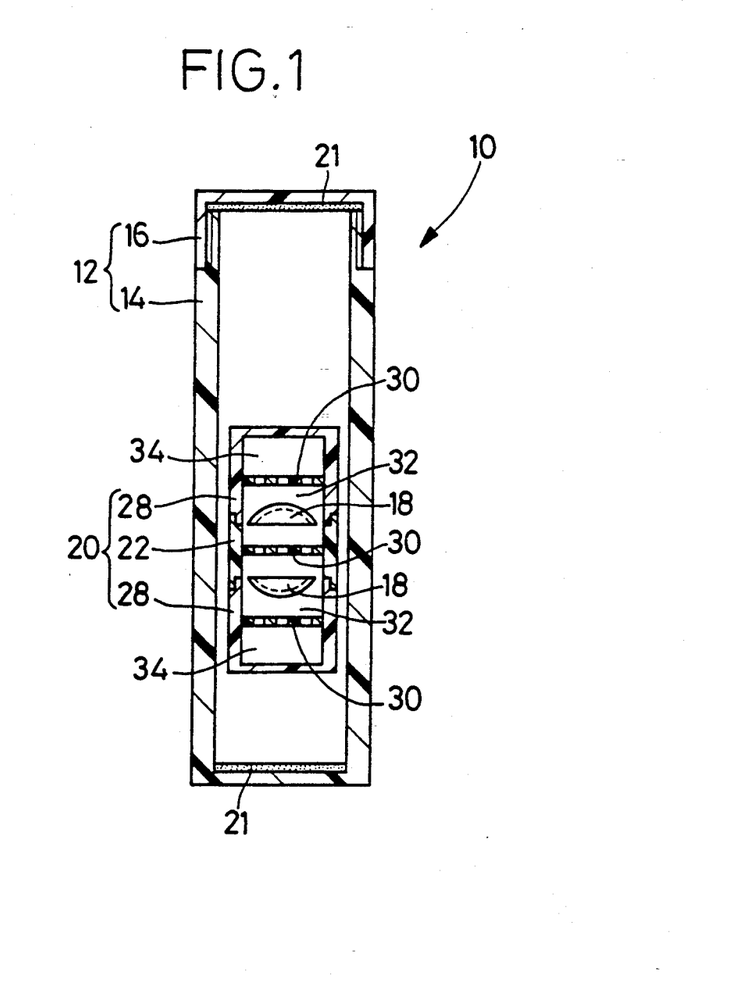
FIG. 1 is an elevational view in longitudinal cross section showing a lens treating device for treating contact lenses as one embodiment of the present invention.

Referring first to FIG. 1, there is shown one embodiment of the present invention in the form of a lens treating device 10 in which a pair of contact lenses 18, 18 are treated with a suitable liquid. In FIG. 1, reference numeral 12 denotes an outer casing which consists of an elongate cylindrical body 14 closed at one axial end, and a lid 16 removably screwed on the other axial end portion of the cylindrical body 14 so as to close the opening of the body 14. Thus, an enclosed space is formed in the outer casing 12. In the enclosed space of the outer casing 12, there is accommodated a lens storage container 20 for storing the contact lenses 18, 18, such that the container 20 is slidable or reciprocable within the outer casing 10 in its axial direction. While the lid 16 is screwed on the cylindrical body 14 in the instant embodiment, other means may be employed for fixing these members 14, 16 together, provided the lid 16 is not detached from the cylindrical body 14 even if the container 20 collides against the lid 16. For example, the lid 16 may be press-fitted on the cylindrical body 14 with a single action, by means of elasticity of one or both of these members 14, 16.

The cylindrical body 14, lid 16 and lens storage container 20 are all formed of a transparent synthetic resin, so that the contact lenses 18 stored in the container 20 can be observed from the outside of the lens treating device 10. In particular, the container 20 needs to be formed of a material which is not affected by a cleaning liquid, for example, and which does not affect the cleaning liquid. Preferably, the container 20 is formed of an anti-bacterial resin material containing anti-bacterial zeolite, which is able to effectively prevent proliferation of bacteria or mold in the lens storage container 20.

The lens storage container 20 is a cylindrical member which is closed at the opposite axial ends. The container 20 has an outside diameter which is more or less smaller than the inside diameter of the outer casing 12, and has a length which is about a half that of the outer casing 12. When the outer casing 12 is shaked in its axial direction or repeatedly inverted in the opposite directions, therefore, the container 20 accommodated in the outer casing 12 is slid along the axis of the casing 12 and is reciprocated or shuttled between the axially opposite closed ends of the casing 12. On the axially opposite inner surfaces of the closed end walls of the outer casing 12, there are provided buffer layers 21 for absorbing shocks and eliminating unfavorable noise when the container 20 hits against the closed end walls of the outer casing 12.

Figure 2:
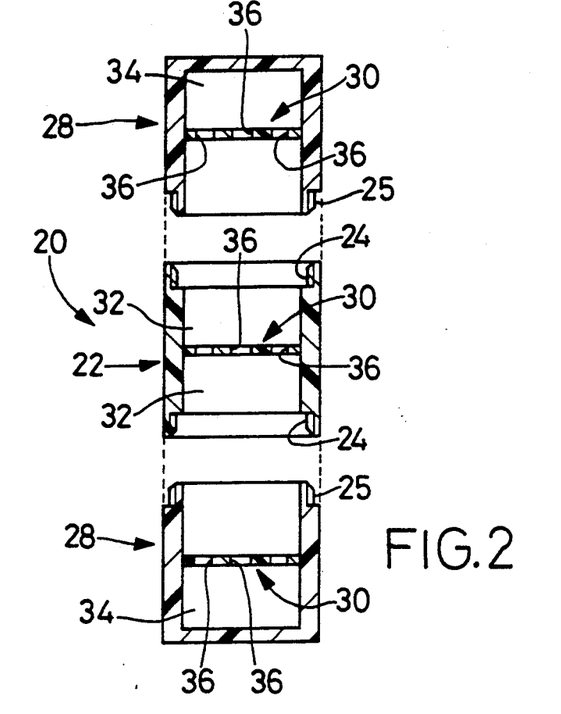
FIG. 2 is an elevational view showing in detail a lens storage container of the lens treating device of FIG. 1.

Referring next to FIG. 2, the lens storage container 20 consists of a cylindrical intermediate member 22, and a pair of cap members 28, 28 attached to the opposite axial ends of the intermediate member 22. Namely, the intermediate member 22 has axially opposite, internally threaded open end portions 24, 24, which are engageable with corresponding externally threaded portions 25, 25 formed in the open end portions of the cap members 28, 28. Thus, the intermediate member 22 and the cap members 28, 28 are detachably assembled together to provide the container 20. In addition, since the internally threaded portions 24 are fluid-tightly held in engagement with the corresponding externally threaded portions 25, the container 20 containing a suitable treatment liquid does not suffer from leakage of the liquid therefrom when the container 20 is slidingly shuttled within the outer casing 12. It is to be understood that the intermediate member 22 and cap members 28 of the lens storage container 20 may be otherwise assembled together provided fluid-tightness of the obtained container 20 is maintained.

In the instant embodiment, each of the intermediate member 22 and the cap members 28, 28 is provided with a disc-shaped partition wall 30 which is secured to the axially intermediate portion of each member 22, 28. The partition walls 30 of these members 22, 28 serve as a partition structure for axially dividing the interior space of each member 22, 28 into two sections. In this arrangement, when the cap members 28, 28 are screwed on the intermediate member 22 as described above, the interior space of the container 20 is divided into four chambers, that is, two lens storage chambers 32, 32 each axially defined between the adjacent partition walls 30, 30, and two other chambers 34, 34 each axially defined between the partition wall 30 and the corresponding one of the axially opposite bottom walls of the cap members 28. Preferably, the height of each lens storage chamber 32, i.e., the distance between the adjacent partition walls 30, 30 is determined to be larger than the height of the contact lens 18, and to be smaller than the diameter of the lens 18, so that the contact lens 18 stored in the lens storage chamber 32 is prevented from being caught or nipped between the partition walls 30, and from being reversed or turned upside down, whereby the position and orientation of the contact lens 18 in the container 20 may be maintained. In this particular embodiment, the contact lenses 18 are horizontally laid to have a horizontal attitude in the respective storage chambers 32 such that the axis of the lenses 18 is parallel to the axis of the container 20, and such that the inner concave surfaces of the two lenses 18 face each other, as shown in FIG. 1.

Figure 3:
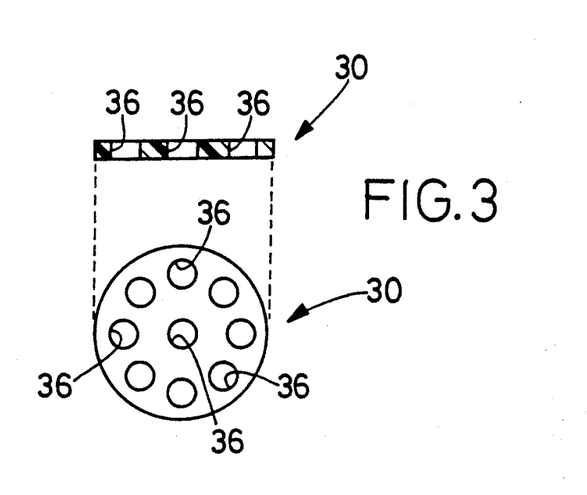
FIG. 3 is a cross sectional view and a plan view both showing a partition wall used in the lens storage container of FIG. 2.

Each of the partition walls 30 has a multiplicity of circular through-holes 36 formed through its thickness. The through-holes 36 are distributed over the entire area thereof, as shown in FIG. 3. Accordingly, the lens storage chambers 32, 32 and the two other chambers 34, 34 are held in fluid communication with each other, so that a suitable liquid for treating the lenses 18 is allowed to freely flow between the adjacent chambers 32, 34.

It is to be understood that the size, shape and number of the through-holes 36 formed through the partition walls 30 are not limited to those of the instant embodiment, but may be suitably changed as needed. For example, the partition walls 30 are reticulated or provided with other forms of apertures, so that a suitable treatment liquid, such as a cleaning liquid, may be passed through the apertures while preventing passage of the contact lenses 18 therethrough.

Figure 4:
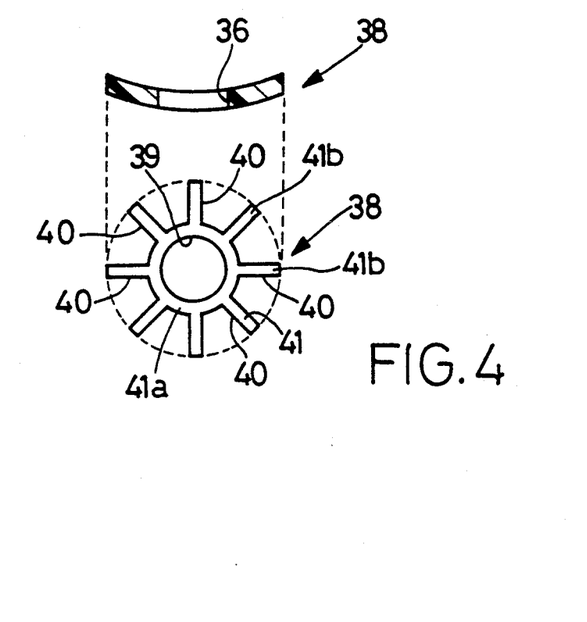
FIG. 4 is a cross sectional view and a plan view both showing another form of the partition wall.
Figure 5:
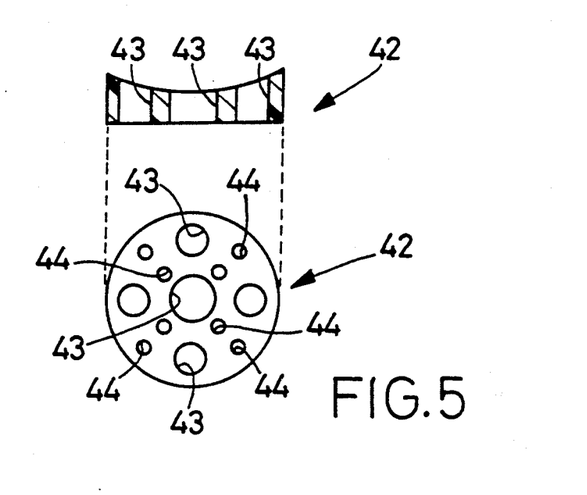
FIG. 5 is a cross sectional view and a plan view both showing a further form of the partition wall.
Figure 6:
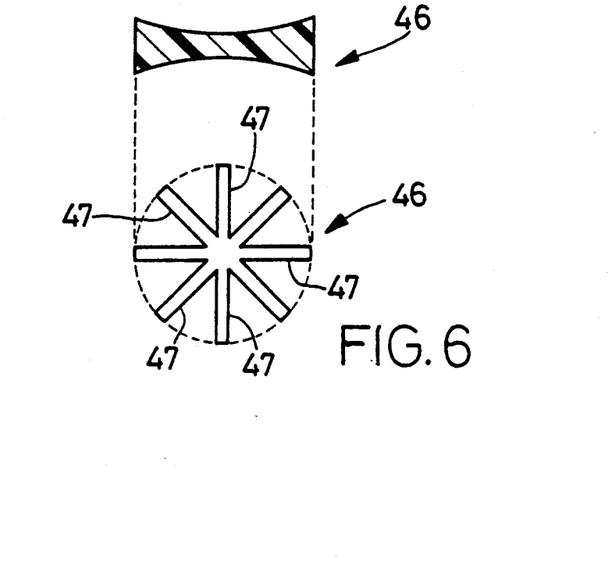
FIG. 6 is a cross sectional view and a plan view both showing still another form of the partition wall.

Referring to FIG. 4, there is shown one example of a partition member in the form of a generally disc-shaped partition wall 38 having a concave upper surface and a convex lower surface. This partition wall 38 has a circular center hole 39, and a plurality of generally trapezoidal apertures 40 formed around the center hole 39. The partition wall 38 includes a ring portion 41a defining the center hole 39, and equally spaced-apart spokes 41b which radially extend from the ring portion 41a. These spokes 41b cooperate with the ring portion 41a and the inner wall of the lens storage container 20 to define the trapezoidal apertures 40. In FIG. 5, there is shown a disc-shaped partition wall 42 having a concave upper surface and a flat lower surface. This partition wall 42 is provided with a combination of relatively large round holes 43 and relatively small round holes 44. In FIG. 6, there is shown another disc-shaped partition wall 46 whose opposite major surfaces are concaved. This partition wall 46 is provided with a plurality of sectorial apertures 47.

While the partition structure is by no means limited to any particular shape (30, 38, 42, 46) as described above, it is desirable that the profile of the partition structure follows that of the contact lens 18, since the effect of cleaning the lens 18 is significantly improved by collision or contact between the lens 18 and the partition structure. Namely, it is desirable that the concave surface of the contact lens faces a convex surface of the partition wall, while the convex surface of the lens faces a concave surface of the partition wall.

There will be described a manner of cleaning a pair of contact lenses by using the lens treating device 10 constructed as described above. Initially, one of the lenses 18 is laid on the partition wall 30 of one of the cap members 28 of the lens storage container 20, and the intermediate member 22 is screwed on the cap member 28. Then, the other lens 18 is laid on the partition wall 30 of the intermediate member 22, and a suitable cleaning liquid is poured into the container 20, usually in the intermediate member 22 closed at one end by the cap member 28. To allow good flow of the liquid within the container 20, the amount of the cleaning liquid preferably ranges from several milliliters to a value slightly smaller than the inner volume of the container 20. More preferably, the amount of the liquid poured is about a half the volume of the container 20. In this respect, the container 20 may be calibrated to provide indications that facilitate measurement of the amount of the liquid poured into the container 20. Subsequently, the other cap member 28 is screwed on the intermediate member 22 with the above-indicated one cap member 28 already screwed thereto, to thereby provide an assembly of the container 20 which maintains its fluid tightness. The thus obtained lens storage container 20 is inserted into the outer casing 12 while the lid 16 is detached from the cylindrical body 14. Then, the lid 16 is re-screwed on the cylindrical body 14.

With the lens storage container 20 accommodated in the outer casing 12, the casing 12 is shaked in the axial direction or repeatedly inverted in the opposite directions, whereby the container 20 is axially slidingly reciprocated between the axially opposite end walls of the casing 12. In this case, the container 20 is moved a relatively large distance in each stroke, compared with the actual distance of movement of the outer casing 12 which is obtained by the shaking by the user. Further, the container 20 hits against the axially opposite end walls of the casing 12 during its reciprocating movement. Consequently, considerably efficient and intensive flows of the cleaning liquid occur within the container 20, assuring a significantly improved effect of cleaning the contact lenses 18 stored in the container 20.

The instant lens treating device 10 having two cylindrical containers 12, 20 is simple in construction, and therefore may be manufactured at a reduced cost. Further, the reciprocative movement of the lens storage container 20 may be smoothly effected such that the outer circumferential surface of the container 20 is in sliding contact with the inner surface of the outer casing 12. Therefore, the lens treating device 10 is unlikely to be broken even if it is roughly handled by the user. Thus, according to the present invention, the contact lenses 18 can be effectively cleaned by using the lens treating device 10, without suffering from damage or breakage of the lenses 18.

In the instant embodiment, the cleaning of the contact lenses 18 is effected while the lenses 18 are stored in the respective lens storage chambers 32 which are separated by the partition walls 30 in the lens storage container 20. Therefore, the lenses 18 are prevented from being moved with the cleaning liquid flowing through the partition walls 30, whereby the cleaning liquid is effectively applied to the opposite major surfaces of the lenses 18. The effect of cleaning the lenses 18 is further enhanced to a considerably large degree, due to collision and sliding contact between the lenses 18 and the partition walls 30 of the lens storage chambers 32.

After the cleaning process described above is finished, the lens storage container 20 is taken out of the outer casing 12, and the cleaning liquid is discharged from the container 20. Then, a suitable liquid for rinsing the lenses 18 is poured into the container 20, and the container 20 is shaked so as to rinse the lenses 18. In this case, it is not necessary to use the outer casing 12 to accommodate the container 20, since the rinsing liquid need not be as intensely circulated within the container 20 as the cleaning liquid. Upon completion of the rinsing operation, the container 20 is filled with a suitable liquid for storing the contact lenses 18, 18.

As is understood from the above description, the use of the lens treating device 10 according to the present invention makes it possible to effect a sequential procedure of cleaning, rinsing and storing contact lenses, while avoiding conventionally experienced damage, loss and contamination of the lenses during a cleaning operation by use of fingers. It will be also understood that the present invention is applicable to both hard contact lenses and soft contact lenses.

While the present invention has been described in detail in its preferred embodiment, with a certain degree of particularity, it is to be understood that the invention is not limited to the details of the above-illustrated embodiment, but may be embodied with various changes, modifications and improvements which may occur to those skilled in the art, without departing from the scope of the present invention. In the following description, the same reference numerals as used in the above embodiment will be used for identifying structurally and functionally corresponding elements, of which no detailed description will be provided.

Figure 7:
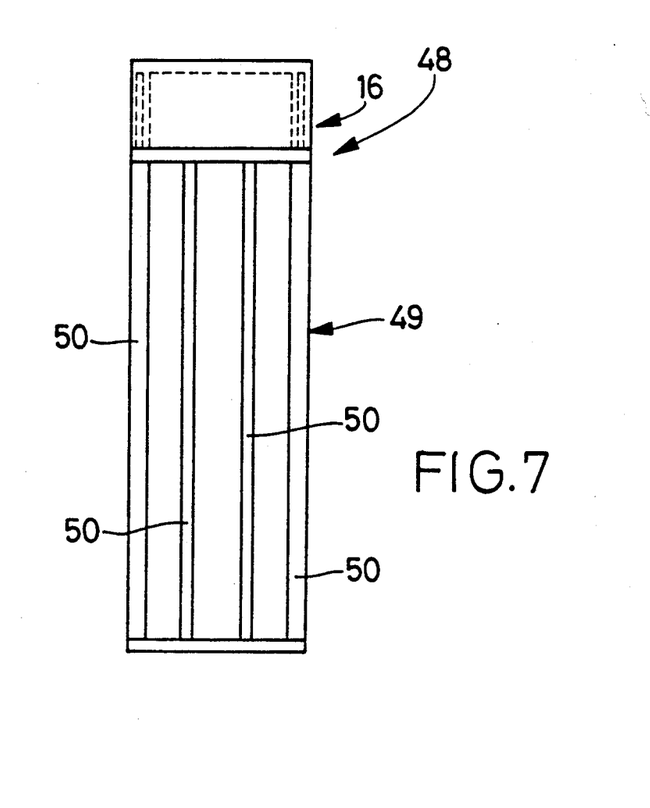
FIG. 7 is a front elevational view showing a modified form of an outer casing used for the lens treating device of the invention.

In the preceding first embodiment, the interior space of the outer casing 12 is enclosed with the lid 16 screwed upon the cylindrical body 14. Referring to FIG. 7, there is shown another example of outer casing 48 which has a cylindrical body 49 whose cylindrical wall portion consists of a plurality of parallel upright bars 50. Thus, the weight of the outer casing 48 is effectively reduced as compared with the outer casing 12 of the first embodiment. Namely, the outer casing used in the present invention is only required to be closed at its axially opposite ends so as to prevent the lens storage container 20 from popping out therefrom, and to have an interior space which permits the container 20 to be slidingly reciprocated in the axial direction. The outer casing may be an elliptic cylinder or a prism, for example. Thus, the principle of the present invention can be practiced even if the cylindrical wall portion of the outer casing is not completely or entirely enclosed. Further, the lid 16 of the outer casing may have a structure similar to the cylindrical body 49.

Figure 8:
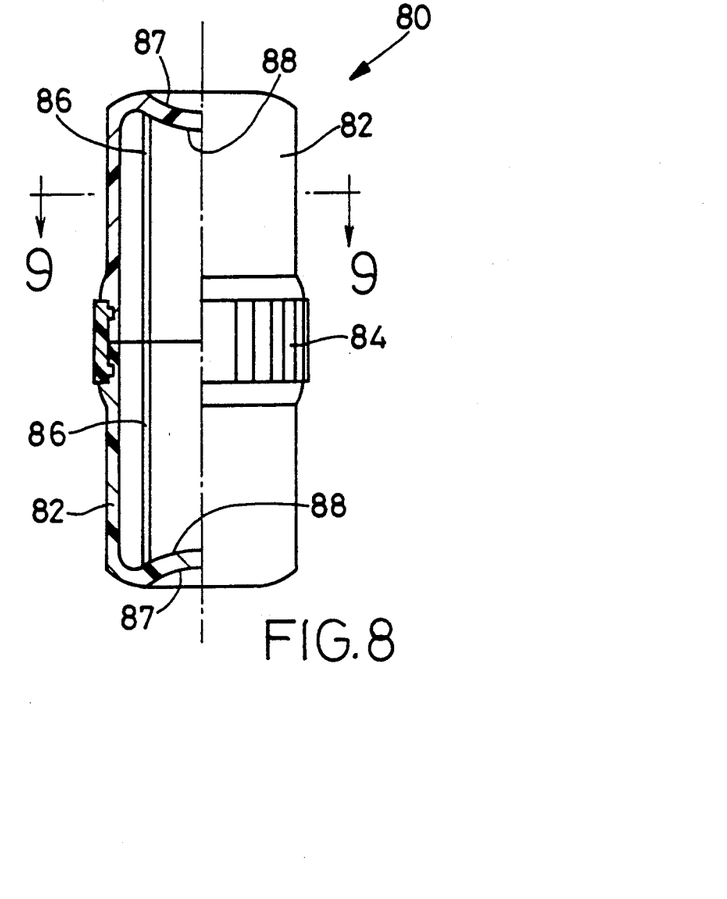
FIG. 8 is a view showing a further modified form of the outer casing, the left half being a longitudinal cross sectional view and the right half being a front elevational view.
Figure 9:
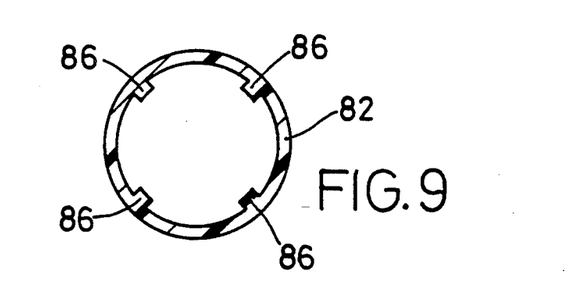
FIG. 9 is a cross sectional view taken along line 9—9 of FIG. 8.
Figures 10, 11:
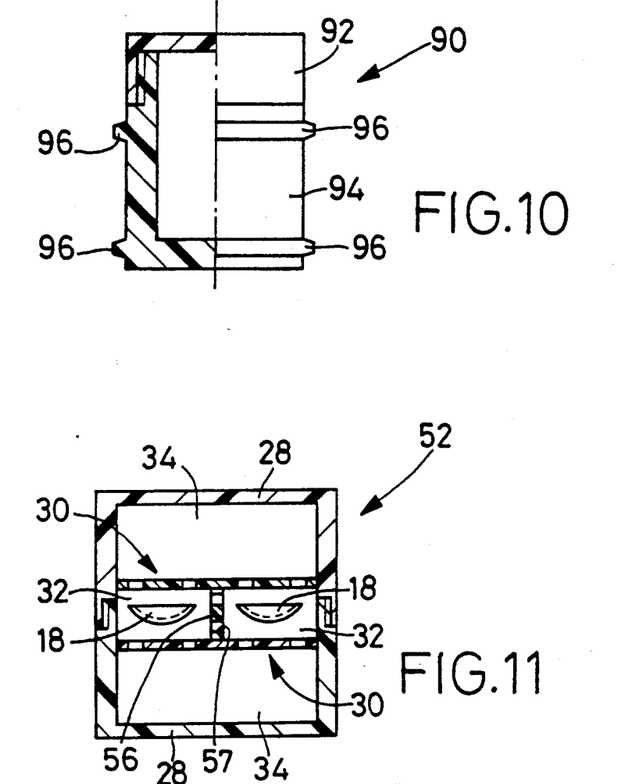
FIG. 10 is a view showing another form of a lens storage container used for the lens treating device of the invention, the left half being a longitudinal cross sectional view and the right half being a front elevational view.
FIG. 11 is a longitudinal cross sectional view showing a further form of the lens storage container.

In FIGS. 8 and 9, there is shown a further example of outer casing 80 which consists of a cylindrical body in the form of a connector ring 84 and two lid members 82, 82 each closed at one axial end. The outer casing 80 is assembled such that the open ends of the lid members 82 are butted together and fitted in the connector ring 84. A plurality of axially extending ribs or rails 86 are formed integrally on the inner surface of the outer casing 80, so as to effectively reduce resistance to the sliding movements of the lens storage container 20 and to prevent the outer surface of the container 20 from being bruised or excessively rubbed, when the container 20 is slidden within the outer casing 80. Further, each of the two lid members 82 of the outer casing 80 has a bottom wall having a concave outer surface 87 and a convex inner surface 88. In this case, the outer casing 80 may be easily gripped at the axially opposite concave outer surfaces 87 of the lid members 82. The convex inner surfaces 88 of the bottom walls of the lid members 82 serve to reduce an area of collision between the outer casing 80 and the container 20, thereby effectively reducing noise caused by the collision, while preventing both of the sleeve and container 80, 20 from being bruised or damaged. The axial ribs 86 may be formed on the outer surface of the container 20. Alternatively, a plurality of annular ribs or lips 96 may be formed on the outer circumferential surface of a lens storage container 90, which consists of a lid 92 and a cylindrical body 94, as shown in FIG. 10.

Figure 20:
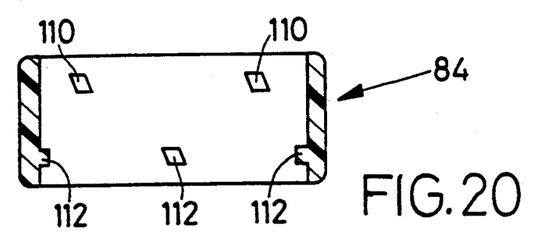
FIG. 20 is a cross sectional view showing a connector ring which is adapted to engage two cylindrical bodies to provide the outer casing of FIG. 8.
Figure 21:
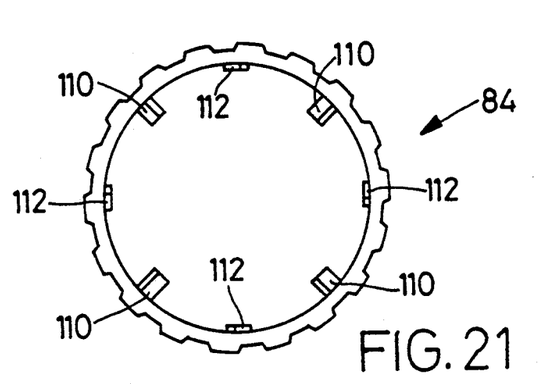
FIG. 21 is a plan view showing the connector ring of FIG. 20.
Figure 22:
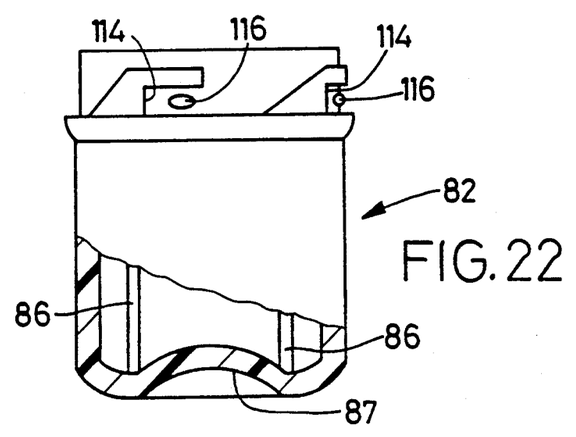
FIG. 22 is a partially cutaway front view showing one of the two cylindrical bodies of the outer casing of FIG. 8.

Referring next to FIGS. 20, 21 and 22, there is illustrated an engaging mechanism adapted for assembling the two lid members 82 and the connector ring 84 to provide the outer casing 10. More specifically, the connector ring 84 has relatively high four pawls 110 formed on one axial end portion of the inner circumferential surface thereof, and relatively low four pawls 112 formed on the other axial end portion thereof, as shown in FIGS. 20 and 21. The pawls 110, 112 are equally spaced from each other and arranged alternately in the circumferential direction of the ring 84, as shown in FIG. 21. On the other hand, each of the lid members 82 has four engaging grooves 114 for receiving the pawls 110, 112 of the ring 84. These grooves 114 are formed on the outer circumferential surface of the open end portion of the lid member 82, such that the grooves 114 are equally spaced from each other in the circumferential direction of the member 82. At the inlet portion of each groove 114, there is provided an engaging boss 116 adapted to engage the corresponding one of the pawls 110, 112. In this arrangement, when the lid members 82, 82 are rotated relative to the connector ring 84, the pawls 110, 112 of the ring 84 pass over the engaging bosses 116, and are inserted into the respective grooves 114 of the members 82. Thus, the connector ring 84 is assembled with the lid members 82, to thereby provide the outer casing 80. When the two lid members 82 are rotated in the reverse directions so as to disassemble the outer casing 80, only one of the members 82 which engages the relatively low pawls 112 is first disengaged from the connector ring 84, because of the difference in the height between the pawls 110 and the pawls 112. In other words, the two lid members 82, 82 are favorably prevented from being disengaged from the connector ring 84 at the same time.

Figure 12:
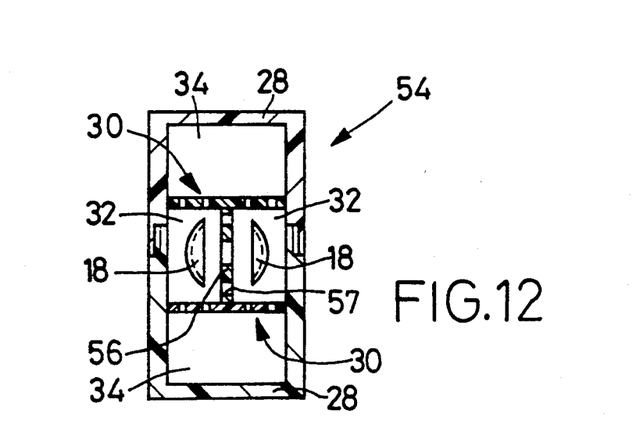
FIG. 12 is a longitudinal cross sectional view showing a still further form of the lens storage container.

The arrangement of the lens storage chambers 32, 32 within the lens storage container 20 may be changed as needed. For instance, in a lens storage container 52 as shown in FIG. 11, the two lens storage chambers 32 are disposed transversely of the container 52, and the contact lenses 18 are positioned to have a horizontal attitude in the respective storage chambers 32. Alternatively, in a lens storage container 54 as shown in FIG. 12, the contact lenses 18 are positioned to have a vertical attitude in the respective lens storage chambers 32 which are also disposed transversely of the container 54. However, it is recognized that the horizontally positioned lenses are more effectively cleaned according to the principle of the present invention, than the vertically positioned lenses, in view of the direction of the flows of the liquid in the lens storage container. In the above two cases, it is desirable that a partition wall 56 which separates the adjacent lens storage chambers 32, 32 is provided with a plurality of through-holes 57 which permit the liquid to flow therethrough between the storage chambers 32, 32. As is apparent from FIGS. 11 and 12, the lens storage container 52, 54 consists of the two cap members 28, 28, which cooperate to define the two transversely arranged storage chambers 32, 32. Namely, the container 52, 54 does not require the intermediate member 22 as used for the lens storage container 20 of the first embodiment.

It is to be understood that the partition structure for defining the lens storage chambers is not necessarily formed from planar (plate-like) wall members as used in the preceding embodiments. In FIGS. 13 through 19, there are shown basket-like partition structures (70) adapted to hold the contact lenses 18.

Figure 13:
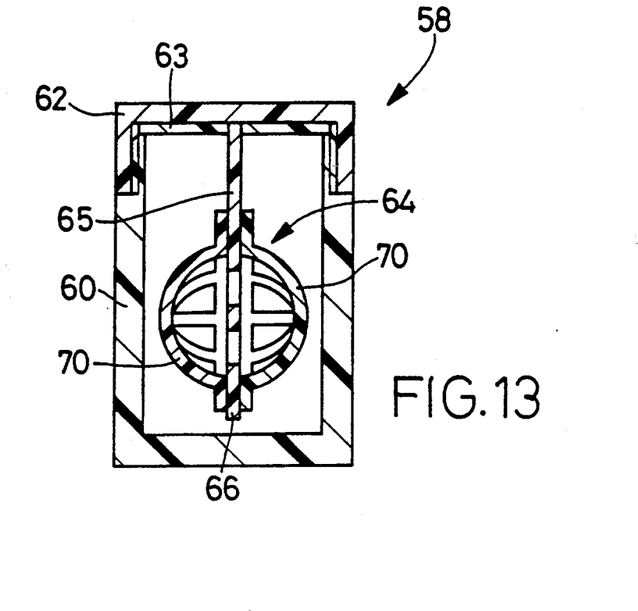
FIG. 13 is a longitudinal cross sectional view showing still another form of the lens storage container.
Figure 14:
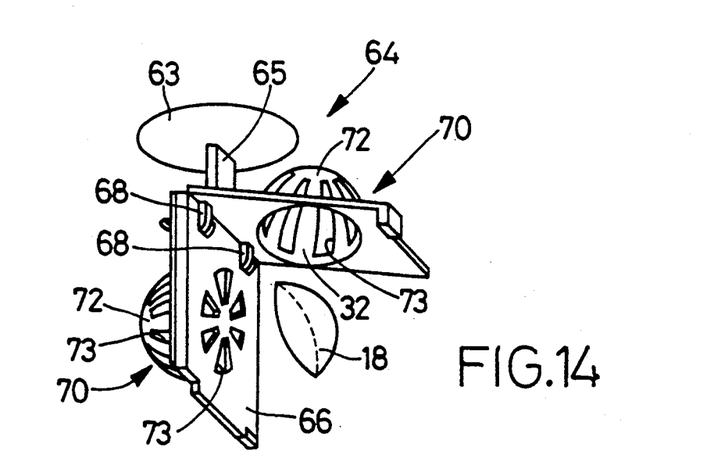
FIG. 14 is a perspective view showing a lens holder of the lens storage container shown in FIG. 13.

More specifically described referring to FIG. 13, a lens storage container 58 consists of a cylindrical body 60 having a bottom wall at one axial end, a cap member 62 which is screwed on the open end portion of the cylindrical body 60, and a lens holder 64 which is fixedly accommodated in the interior of the container 58. The lens holder 64 has a disc member 63 whose peripheral portion is gripped by and between an end face of the open end of the cylindrical body 60 and the inner surface of the bottom wall of the cap member 62. The lens holder 64 includes a support 65 which extends from a central portion of the disc member 63 in a direction perpendicular to the plane of the member 63, and a rectangular center plate 66 which extends in the same direction as the support 65 and is fixedly connected to the disc member 63 through the support 65. As shown in FIG. 14, the lens holder 64 further includes a pair of pivotable members 70, 70 which are disposed on the opposite major surfaces of the center plate 66 and are held in engagement with the plate 66 by means of hinges 68, 68. These center plate 66 and pivotable members 70 normally extend in the direction perpendicular to the plane of the disc member 63, and the pivotable members 70 are pivotable about the hinges 68 with respect to the center plate 66. Each of the pivotable members 70 has a semi-spherical basket portion 72 formed at its central part, in which a contact lens 18 is accommodated and vertically positioned. Namely, the basket portions 72 of the pivotable members 70 cooperate with the center plate 66 to defined the two lens storage chambers 32. These basket portions 72 and center plate 66 are formed with multiple through-holes 73, which allow the liquid in the container 58 to effectively flow through the lens storage chambers 32. Thus, the contact lenses 18 may be cleaned, rinsed and stored in sequence, with high efficiency and an excellent cleaning result.

Figure 15:
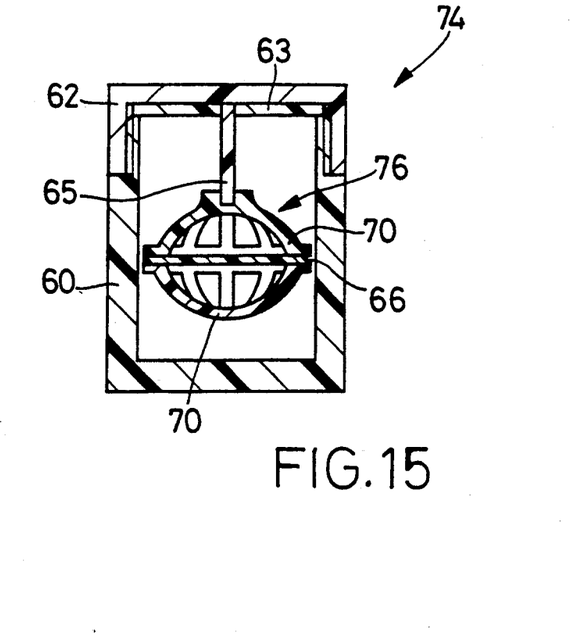
FIG. 15 is a longitudinal cross sectional view showing another form of the lens storage container.
Figure 16:
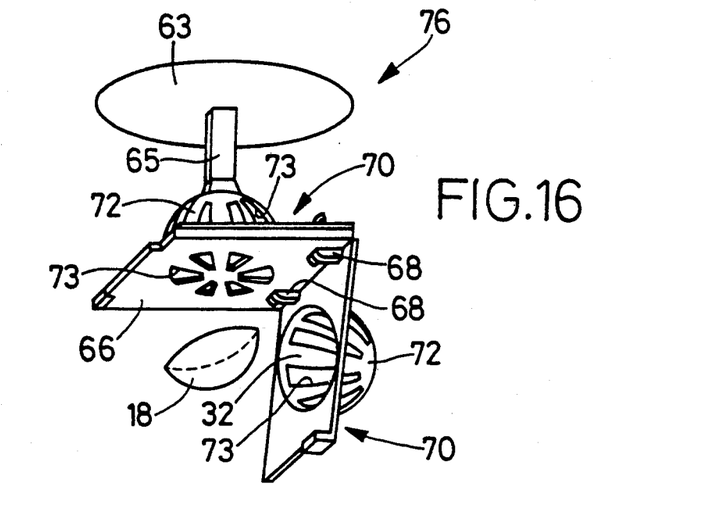
FIG. 16 is a perspective view showing a lens holder of the lens storage container shown in FIG. 15.
Figure 17:
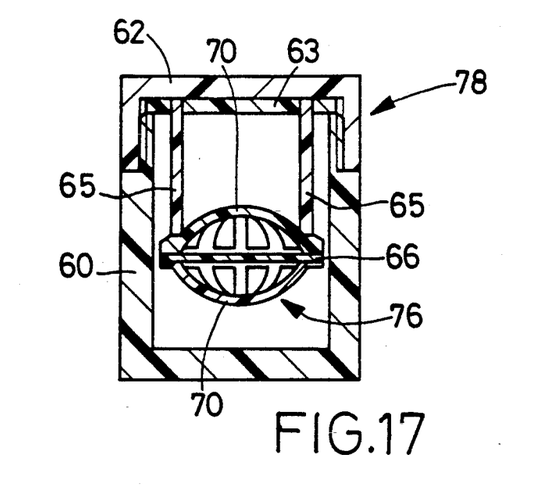
FIG. 17 is a longitudinal cross sectional view showing still another form of the lens storage container.

In a lens storage container 74 shown in FIG. 15, the contact lenses 18 are horizontally positioned in the respective lens storage chambers 32. More specifically described referring to FIG. 16, the container 74 has a lens holder 76 having the center plate 66 and two pivotable members 70 which normally extend in a horizontal direction parallel to the plane of the disc member 63. The support 65 is fixed to the disc member 63 and one of the basket portions 72 of the pivotable members 70, for connecting these members 63, 70. A lens storage container 78 shown in FIG. 17 is similar to the container 74 of FIG. 15, except that the lens holder 76 has two supports 65 for supporting the center plate 66 and the pivotable members 70.

Figure 18:
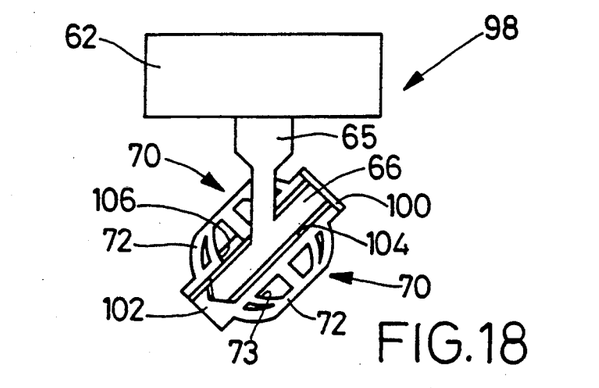
FIG. 18 is a side elevational view showing another form of the lens holder.

FIG. 18 shows a lens holder 98 in which the center plate 66 and pivotable members 70, 70 are fixed to the supports 65 such that these members 66, 70 are inclined a suitable angle with respect to the supports 65. In this lens holder 98, therefore, the contact lenses 18 accommodated in the respective basket portions 72 are obliquely positioned with respect to the bottom wall of the cap member 62. When the contact lenses 18 are vertically disposed as in the embodiment of FIG. 13, the lenses 18 can be easily put into and taken out of the basket portions 72. However, the lenses 18 are less effectively exposed to the flows of the liquid in the container 58 during the cleaning operation, resulting in deterioration in the effect of cleaning the lenses 18. When the contact lenses 18 are horizontally disposed as in the embodiments of FIGS. 15 and 17, the lenses 18 may be effectively cleaned with an improved result, because of good exposure of the lenses 18 to the liquid flows. However, the handling ease of the lenses 18 is deteriorated when the lenses 18 are put into and taken out of the basket portions 72. Therefore, when the contact lenses 18 are obliquely positioned as in the lens holder 98 shown in FIG. 18, both an excellent cleaning effect and good handling ease of the lenses 18 can be assured. The lens holder 98 is provided with two supports 65 which are secured to two side faces of the center plate 66.

Figure 19:
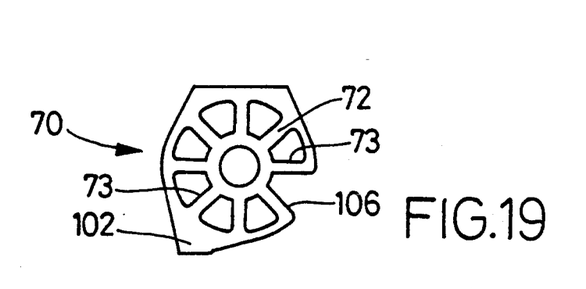
FIG. 19 is a front elevational view showing a pivotable member used in the lens holder of FIG. 18.

In the lens holder 98, the pivotable members 70, 70 are connected to the center plate 66 by a resilient connecting member 100, such that the pivotable members 70 are pivotable about the connecting member 100 with respect to the center plate 66. The pivotable members 70 are formed with respective engaging portions 102, which are adapted to engage the center plate 66 such that a slight gap is formed between the center plate 66 and the pivotable member 70 when it is placed in the closed position as shown in FIG. 18. In this arrangement, the contact lens 18 is prevented from being broken even if a peripheral part of the lens 18 is erroneously nipped between the pivotable member 70 and the center plate 66. Further, a cutout 106 is formed in the basket portion 72 of the pivotable member 70, as shown in FIG. 19, so as to make it easy to pick up the lens 18 by fingers or forceps. In this embodiment of FIG. 18, the disc member (63) is fixed to the inner surface of the cap member 62 by bonding, for example, so that the cap member 62 and the lens holder 98 may be handled as an assembly.

In the lens holder 64, 76, 98 as described above, the center plate 66 may be adapted to be pivotable relative to the support(s) so that the contact lenses 18 may be stored in the lens holder in a desired one of vertical and horizontal positions. Further, the lens storage container does not necessarily have the two lens storage chambers 32 as in the illustrated embodiments, but may have one or three or more chambers for storing contact lenses. It is also to be understood that according to the present invention, a sufficiently high degree of cleaning effect can be obtained even if no lens storage chamber is formed in the lens storage container.

EXAMPLES

Some tests were conducted to observe the effect of cleaning contact lenses by using the lens treating device constructed according to the present invention. The manner and results of the tests will be described below.

EXAMPLE 1

There were prepared some contact lenses which were stained with lipid, more specifically, eye shadow, eye liner and lip rouge (all of which are cosmetics). The contact lenses with each kind of stain were stored in the respective lens storage chambers of a lens storage container of a lens treating device which is constructed as shown in FIG. 1. Then, with an outer casing of the device gripped by a hand, the lens treating device is axially shaken up and down about 20 times so as to clean the contact lenses stored therein. As a result, all kinds of stains indicated above were completely removed from the contact lenses. In the test, 4 ml of MENICLEAN (tradename, which is available from Menicon Co., Ltd.) serving as a cleaning liquid was poured into the lens storage container. The lens storage container and outer casing of the lens treating device used for the test were dimensioned as indicated below. (a) lens storage container

| Outside diameter: | 22 mm | Inside diameter: | 18 mm |
|---|---|---|---|
| Wall thickness: | 2 mm | Overall length: | 44 mm |

The container was provided with three partition walls having the configuration as shown in FIG. 4, such that one of the walls is located at an axially intermediate portion of the container, while the two other walls are disposed on the opposite sides of the one wall with a 10 mm spacing left between the adjacent walls. (b) outer casing

| Outside diameter: | 28 mm | Inside diameter: | 24 mm |
|---|---|---|---|
| Wall thickness: | 2 mm | Overall length: | 114 mm |

EXAMPLE 2

The cleaning test similar to that of Example 1 was conducted on contact lenses stained with eye shadow, by using a lens treating device which has an outer casing having an overall length of 84 mm. When the lens treating device was shaken up and down about 30 times, the lipid stains (eye shadow) were completely removed from the lenses.

EXAMPLE 3

The cleaning test similar to Example 1 was conducted on contact lenses stained with eye shadow, by using a lens treating device having partition walls which are shaped as shown in FIG. 3. When the lens treating device was shaken up and down about 20 times, the lipid stains (eye shadow) were completely removed from the lenses.

EXAMPLE 4

The cleaning test similar to Example 1 was conducted on contact lenses stained with eye shadow, by pouring 8 ml of a cleaning liquid into the lens storage container. When the lens treating device was shaken up and down about 20 times, the lipid stains (eye shadow) were completely removed from the lenses.

EXAMPLE 5

The cleaning test similar to Example 1 was conducted on contact lenses stained with eye shadow, by using a lens treating device having a lens storage container which is provided with three partition walls that are spaced apart from each other by 5 mm. The middle one of the three partition walls was located in an axially intermediate portion of the container. When the lens treating device was shaken up and down about 20 times, the lipid stains (eye shadow) were completely removed from the lenses.

EXAMPLE 6

A pair of contact lenses stained with protein were prepared and stored in the lens storage chambers of the lens storage container of the lens treating device as used in Example 1. Then, a cleaning liquid containing enzyme was poured into the lens storage container, and the lenses were immersed in the liquid for about two hours. The cleaning liquid was prepared by dissolving a tablet of HYDROCARE F (tradename, which is available from SANTEN ARAGAN Co., Ltd) in 10 ml of distilled water. After immersion of the lenses in the cleaning liquid, the lens treating device was axially shaken up and down about 20 times, with the outer casing of the device gripped by a hand, so as to clean the contact lenses. As a result, the protein stains were completely removed from the lenses.

EXAMPLE 7

The cleaning test similar to Example 1 was conducted by using 5 ml of a cleaning liquid which is prepared from 1.25 ml of MENICLEAN (tradename, which is available from Menicon Co., Ltd) and 3.75 ml of MENISOAK (tradename, which is available from Menicon Co., Ltd). When the lens treating device was shaken up and down about 20 times, all kinds of stains were completely removed from the contact lenses.

COMPARATIVE EXAMPLE 1

The cleaning test similar to Example 1 was conducted on contact lenses stained with eye shadow, by taking the lens storage container out of the lens treating device as used in Example 1, and shaking the container directly by a hand. When the container was shaken up and down about 30 times, only 60%-70% of the lipid stain (eye shadow) was removed from the contact lenses. Namely, 30-40% of the lipid stain remained on the lenses.

What is claimed is:

1. A lens treating device for treating a contact lens, comprising:
   an outer casing having a cylindrical body which is open at at least one of opposite axial ends, and at least one lid removably attached to said cylindrical body to close said at least one axial end thereof; and
   a fluid-tight lens storage container which is accommodated in said outer casing such that said container is axially slidingly reciprocable within said outer casing, said lens storage container having at least one cap member removably attached thereto, said lens storage container fluid-tightly receiving therein a contact lens and a liquid for treating the contact lens, whereby said liquid is forced to flow within said container so as to clean said contact lens, by a reciprocating movement of said lens storage container when said outer casing is axially shaked or repeatedly inverted.

2. A lens treating device according to claim 1, wherein said lens storage container has at least one lens storage chamber for accommodating said contact lens, said at least one lens storage chamber being at least partially defined by a partition structure having a plurality of holes formed therethrough to permit said liquid to flow therethrough.

3. A lens treating device according to claim 2, wherein said at least one lens storage chamber comprises two lens storage chambers, and said partition structure comprises three disc-like partition walls which are spaced from each other in a longitudinal direction of said lens storage container, each of said two lens storage chambers being defined in said longitudinal direction by adjacent ones of said three partition walls.

4. A lens treating device according to claim 3, wherein said lens storage container consists of two cap members and a cylindrical member which is interposed between said cap members in said longitudinal direction, said three disc-like partition walls being secured to said two cap members and said cylindrical member, respectively.

5. A lens treating device according to claim 2, wherein said partition structure has at least one concave major surface and at least one convex major surface, so as to improve the effect of cleaning said contact lens significantly by collision or contact between said contact lens and said at least one concave major surface and said at least one convex major surface.

6. A lens treating device according to claim 2, wherein said partition structure has at least one concave major surface so as to improve the effect of cleaning said contact lens significantly by collision or contact between said contact lens and said at least one concave major surface.

7. A lens treating device according to claim 2, wherein said at least one lens storage chamber comprises two lens storage chambers which are arranged in a transverse direction of said lens storage container, said partition structure comprising two partition walls which are spaced from each other in a longitudinal direction of said container and one partition wall which extends between said two partition walls in said longitudinal direction so as to separate said two lens storage chambers from each other.

8. A lens treating device according to claim 2, wherein said partition structure comprises a center plate and two pivotable members which are pivotably disposed on the opposite sides of said center plate, said two pivotable members having respective basket portions for accommodating said contact lens.

9. A lens treating device according to claim 1, wherein said lens storage container consists of two cap members which are connected to each other at mutually facing open end portions thereof.

10. A lens treating device according to claim 1, wherein said lens storage container consists of a cylindrical member, and a cap member which is removably fixed to said cylindrical member.

11. A lens treating device according to claim 1, wherein said cylindrical body of said outer casing is closed at one axial end, said at least one lid consisting of a single lid which is removably fixed to the other axial end of said cylindrical body.

12. A lens treating device according to claim 1, wherein said cylindrical body of said outer casing has a cylindrical wall portion which consists of a plurality of upright bars which extend in the axial direction of said outer casing.

13. A lens treating device according to claim 1, wherein said outer casing consists of two lid members as said at least one lid, and a connector ring as said cylindrical body which connects said two lid members.

14. A lens treating device according to claim 1, wherein said outer casing further has a plurality of axially extending ribs formed integrally on an inner circumferential surface of said cylindrical body.

15. A lens treating device according to claim 1, wherein said lens storage container has a plurality of annular ribs formed on an outer circumferential surface thereof.

* * * * *